United States Patent [19]

Bennett et al.

[11] 4,402,833
[45] Sep. 6, 1983

[54] WASTE WATER TREATMENT SYSTEM FOR ELEMENTAL PHOSPHOROUS REMOVAL

[75] Inventors: W. Clark Bennett; Theodore T. Garrett, both of Columbia, Tenn.

[73] Assignee: Occidental Chemical Corporation, Niagara Falls, N.Y.

[21] Appl. No.: 237,806

[22] Filed: Feb. 24, 1981

Related U.S. Application Data

[63] Continuation of Ser. No. 102,717, Dec. 13, 1979, abandoned.

[51] Int. Cl.³ .................................................. C02F 1/58
[52] U.S. Cl. ...................................... 210/667; 210/721; 210/906
[58] Field of Search .............. 210/906, 907, 667, 718, 210/721

[56] References Cited

U.S. PATENT DOCUMENTS 3,876,451  4/1975  Zail ................................. 210/906 X
3,971,707  7/1976  Deshponde .................... 210/906 X

FOREIGN PATENT DOCUMENTS 51-34565  3/1976  Japan ................................. 210/906
888085    1/1962  United Kingdom .
556113    5/1977  U.S.S.R. ............................ 210/906

OTHER PUBLICATIONS

Nesbitt, "Phosphorus Removal—State of the Art," *Jour. Water Poll. Control Found.*, vol. 41, 1969, pp. 701–713.
Van Wazer, "Phosphorus and its Compounds," Interscience Publishers, 1961, vol. II, pp. 1204–1205.

*Primary Examiner*—Thomas G. Wyse
*Attorney, Agent, or Firm*—James F. Tao; William G. Gosz

[57] ABSTRACT

An environmentally sound system for the removal of elemental phosphorus from waste water resulting from phosphorus manufacture, use, conversion to other products, and storage, wherein the waste water is treated with a material such as lime that produces an insoluble phosphate, filtering the precipitate and passing the filtrate through a column of an adsorbent, such as activated carbon, to produce elemental phosphorus-free water which can be discarded without deleterious effects to the environment.

1 Claim, No Drawings

WASTE WATER TREATMENT SYSTEM FOR ELEMENTAL PHOSPHOROUS REMOVAL

This is a continuation of application Ser. No. 102,717, filed Dec. 13, 1979, now abandoned.

BACKGROUND OF THE INVENTION

The present invention deals with a process for the reduction of elemental phosphorus in a waste water stream.

During the production of phosphorus, large quantities of water are employed to cool the gases from the furnaces, and additional quantities of water are used to protect the phosphorus produced from contact with the atmosphere and possible rapid oxidation and combustion. These large quantities of water cannot be easily disposed of until the dissolved and dispersed offending materials are removed. The waste water produced is passed from the producing plant to storage containers for treatment before being discharged into nearby streams and lakes.

The waste water will contain dissolved phosphorus salts, generally in the form of phosphate ($PO_4^5$) or as other phosphate salts; suspended or colloidal phosphorus; and other inorganic solid materials that might be carried over from the furnace.

The term "waste water" includes, in addition to water used in phosphorus production plants, water used in other operations that utilize elemental phosphorus, such as water used in the loading and unloading of railroad cars used to transport phosphorus, water used in the conversion of phosphorus to other chemical entities including phosphorus pentoxide, phosphoric acid, phosphorus pentasulfide, etc., or any water which contains elemental phosphorus, regardless of its generation method.

Although phosphorus is an essential element to the biological cycle, excesses can provide problems to the environment, and the current standards of the agencies that control the discharge of waste water streams have placed stringent controls on the amounts of elemental phosphorus discharged into the environment.

The large use of phosphates as detergent builders in cleaning and washing, both commercially and in home use, has resulted in sewage and waste waters with unusually high phosphate content which has disrupted the phosphate cycle in nature. This has resulted in efforts to remove the offending phosphates from the effluent streams and has provided many techniques for its economical and efficient removal. The use of lime to precipitate or flocculate the phosphates, followed by removal of the precipitates, is well known in the art as illustrated by the article, "Phosphorus Removal—The State of the Art," JOURNAL OF THE WATER POLLUTION CONTROL FOUNDATION, Volume 41, pages 701-, 1969. The use of cationic polyelectrolytes is disclosed in U.S. Pat. No. 4,043,910 and is issued to Field; while aeration alone, or with flocculents, is shown in U.S. Pat. Nos. 3,872,002, 3,956,118, and 4,042,493.

The reduction of elemental phosphorus in waste water streams has been conducted by several techniques. Generally, through the controlling of pH and the addition of chemicals to convert the phosphorus to phosphorus salts, which can be precipitated and later removed, has been the conventional approach. The use of aeration and/or chlorination has been successfully employed. British Pat. No. 888,085 discloses a method of pH control using an akali metal hydroxide to adjust pH and precipitate the phosphorus salts simultaneously.

The elemental phosphorus discussed above is generally dispersed particles, colloidal in nature, of white phosphorus (sometimes called "yellow phosphorus"), with the color due to impurities present. White phosphorus has a solubility of one-part-per-300,000 parts of water, or 3.3 milligrams-per-liter. Agencies controlling the pollution in streams and waterways desire to keep the levels of elemental phosphorus as near to zero as possible, but permissible levels are allowed in the microgram-per-liter range.

It is the object of this invention to provide a system or method that will reduce the level of elemental phosphorus to a fraction of a microgram-per-liter.

It should be understood that the novelty of this invention does not reside in the removal of solube phosphates resident in the waste water but in the removal of elemental phosphorus resident in the waste water.

SUMMARY OF THE INVENTION

The essentially complete removal of elemental phosphorus from a waste water stream is accomplished by the addition of a material that produces an insoluble phosphate, such as lime, to the waste stream, removal of the precipitate by settling and filtration, and passage through an adsorbent material such as an activated carbon layer. This system removes the elemental phosphorus from the waste stream to a level of less than one-part-per-billion which meets environmental standards.

DETAILED DESCRIPTION OF THE INVENTION

In a preferred embodiment, this invention uses waste water from phosphorus production facilities containing, as the primary ingredients in the water, elemental phosphorus which is usually dispersed throughout the liquid as colloidal, dissolved phosphorus, and soluble phosphate salts.

The waste water is collected from various parts of the phosphorus manufacturing and storage processes, from operations such as loading and unloading of railroad cars used for transporting elemental phosphorus, and from operations where elemental phosphorus is converted to chemical entities. The pH of the input stream will range from about 6 to about 8. A soluble calcium salt, usually lime (calcium oxide) or calcium hydroxide is added to the water and thoroughly dispersed. The addition of the calcium salt allows the formation of calcium phosphates which are insoluble and will thereby precipitate and can be removed. The precipitate may not settle out of the solution but may form a flocculent structure that may remove other solid particles from the waste water.

The quantity of calcium salt (lime) added to the holding tank will vary with the makeup of the waste water; sufficient lime is added until the pH reaches the region of about 9 to about 10.

The pH of the waste water after addition of the calcium salt is determined by the operator relative to the concentration of the incoming water.

After the addition of the lime, adequate time is allowed for the precipitate or flocculent to settle, and the solution is then passed to a filtration bed for the precipitate or flocculent removal. This bed is composed of layers of sand of varying sizes and of anthracite coal of varying sizes.

The water after leaving the filtration bed is passed to a container of activated carbon. The water would remain in contact with the activated carbon for a period of time from about 15 minutes to 60 minutes.

The water upon exiting the activated carbon column is essentially free of elemental phosphorus and can be discarded, if desired, or reused as elemental phosphorus-free water. The following table illustrates the effect of this method.

TABLE I

| Experiment | Carbon Contact Time | Elemental Phosphorus* Before Treatment | After Treatment |
|---|---|---|---|
| A | 56 min. | 28 ppb | 0.03 ppb |
| B | 56 | 639 | 1.9 |
| C | 56 | 275 | 0.30 |
| D | 56 | 138 | 0.12 |

*Elemental phosphorus is measured in parts-per-billion as determined by gas chromatographic analysis.

The specifications established by various federal, state, and local agencies responsible for water purification and safety have established limits of 1-to-5 parts-per-billion as safe limits for elemental phosphorus.

It has been found that following the addition of lime to the water, the passage of air through the solution will assist in the reduction of elemental phosphorus. The theoretical basis for this step is not certain, but it has been postulated that some of the phosphorus is converted to phosphate by the aeration step or that the flocculent precipitate adsorbs some of the colloidal phosphorus present. This is shown in Table II.

TABLE II

| Sample | Aeration Time | Air Volume | Elemental Phosphorus Before Treatment | After Treatment |
|---|---|---|---|---|
| F | 11 min. | 1.3 | 311 | 110 |
| G | 20 | 1.3 | 311 | 54 |
| H | 30 | 1.3 | 311 | 23 |
| J | 50 | 1.3 | 311 | 4 |
| K | 45 | 2.0 | 241 | ND |
| L | 45 | 2.0 | 244 | ND |
| M | 45 | 2.0 | 172 | ND |
| N | 45 | 2.0 | 241 | ND |
| O | 45 | 2.0 | 266 | 0.05 |

Air Volume = Volume air/minutes/volume of water
ND = Not detectable

Although we have illustrated our invention by the examples given in the above detailed description, various modifications can be used. The precipitation of soluble phosphates may be accomplished by the addition of materials other than soluble calcium salts such as lime. Materials that may be employed for this step include alum, salts of nickle, iron, barium, magnesium, or cobalt to mention but a few of the materials that will produce an insoluble phosphate.

Similarly, other absorbents can be employed in place of activated carbon, such as diatomaceous earth or kieselguhr, fuller's earth, and like materials.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

We claim:

1. A process for the preparation of essentially elemental phosphorus-free water from industrial waste water comprising the steps of: (a) treating the industrial waste water with lime at a pH of from about 9 to about 10 to precipitate soluble phosphates, (b) aerating the mixture with air, (c) removing the precipitate by filtration, and (d) passing the filtrate through a bed of activated carbon to produce water which can be discarded without deleterious effects to the environment.

* * * * *